United States Patent
Matsuura et al.

(10) Patent No.: US 11,067,688 B2
(45) Date of Patent: Jul. 20, 2021

(54) OBSTACLE DETECTION APPARATUS FOR VEHICLES

(71) Applicants: DENSO CORPORATION, Kariya (JP); TOYOTA JIDOSHA KABUSHIKI KAISHA, Toyota (JP)

(72) Inventors: Mitsuyasu Matsuura, Nishio (JP); Yasutaka Atarashi, Kariya (JP); Tsuyoshi Ando, Kariya (JP); Motonari Ohbayashi, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 15/515,537

(22) PCT Filed: Oct. 21, 2015

(86) PCT No.: PCT/JP2015/005299
§ 371 (c)(1),
(2) Date: Mar. 29, 2017

(87) PCT Pub. No.: WO2016/063528
PCT Pub. Date: Apr. 28, 2016

(65) Prior Publication Data
US 2017/0242120 A1 Aug. 24, 2017

(30) Foreign Application Priority Data
Oct. 22, 2014 (JP) .............................. JP2014-215720

(51) Int. Cl.
*G01S 15/00* (2020.01)
*G01S 15/931* (2020.01)
(Continued)

(52) U.S. Cl.
CPC ............ *G01S 15/931* (2013.01); *G01S 7/527* (2013.01); *G01S 7/62* (2013.01); *G01S 15/46* (2013.01);
(Continued)

(58) Field of Classification Search
None
See application file for complete search history.

(56) References Cited

U.S. PATENT DOCUMENTS 4,868,796 A * 9/1989 Ahrens ..................... B65F 3/04
367/96
4,910,512 A * 3/1990 Riedel .................... G01H 3/005
340/901

(Continued)

FOREIGN PATENT DOCUMENTS

JP         63284494 A   * 11/1988
JP         H11-304919 A    11/1999
JP         3550322 B2    8/2004

*Primary Examiner* — Isam A Alsomiri
*Assistant Examiner* — Jonathan D Armstrong
(74) *Attorney, Agent, or Firm* — Maschoff Brennan

(57) ABSTRACT

An obstacle detection apparatus for vehicles includes: a first ultrasonic sensor for detecting a distance to an obstacle; a second ultrasonic sensor at a position of the vehicle for receiving a reflection wave from the obstacle of an ultrasonic wave from the first ultrasonic wave; a notifier that gives a notification of detecting the obstacle present within a preset distance in one or more of predetermined notification areas including a first notification area for the first ultrasonic sensor, and a second notification area for the second ultrasonic sensor detects the obstacle for the vehicle; and a controller that controls contents to be notified by the notifier. Furthermore, the controller determines whether a first indirect wave distance and a second indirect wave distance are used to determine whether to give the notification of detecting the obstacle in the first notification area.

7 Claims, 8 Drawing Sheets

(51) Int. Cl.
*G01S 15/46* (2006.01)
*G01S 7/527* (2006.01)
*G01S 15/87* (2006.01)
*G01S 7/62* (2006.01)
*G01S 7/56* (2006.01)

(52) U.S. Cl.
CPC .............. *G01S 15/878* (2013.01); *G01S 7/56* (2013.01); *G01S 2015/938* (2013.01)

(56) References Cited

U.S. PATENT DOCUMENTS

| | | | | |
|---|---|---|---|---|
| 5,689,250 A * | 11/1997 | Kremser | | G01S 7/527 340/435 |
| 5,764,136 A * | 6/1998 | Harron | | B60Q 1/52 340/435 |
| 5,869,764 A * | 2/1999 | Schulte | | B60Q 9/006 367/140 |
| 5,980,048 A * | 11/1999 | Rannells, Jr. | | B60R 1/025 180/167 |
| 6,152,238 A * | 11/2000 | Ferrell | | E02F 3/847 172/2 |
| 2004/0088079 A1* | 5/2004 | Lavarec | | G01S 17/026 700/258 |
| 2004/0090316 A1* | 5/2004 | Li | | G01S 15/931 340/435 |
| 2005/0088334 A1* | 4/2005 | Herder | | G01S 7/527 342/70 |
| 2005/0122234 A1* | 6/2005 | Danz | | B60Q 9/007 340/932.2 |
| 2006/0259213 A1* | 11/2006 | Hashimoto | | G01S 15/74 701/23 |
| 2007/0008819 A1* | 1/2007 | Diessner | | G01S 7/52004 367/99 |
| 2007/0024431 A1* | 2/2007 | Touge | | B60Q 9/00 340/436 |
| 2008/0218324 A1* | 9/2008 | Li | | G01S 15/42 340/435 |
| 2010/0008515 A1* | 1/2010 | Fulton | | H04R 3/005 381/92 |
| 2010/0228482 A1* | 9/2010 | Yonak | | G01S 3/8083 701/301 |
| 2012/0026836 A1* | 2/2012 | Scripca | | G01S 15/18 367/99 |
| 2012/0120768 A1* | 5/2012 | Horsky | | G01S 7/536 367/93 |
| 2013/0128699 A1* | 5/2013 | Schmid | | G01S 15/42 367/99 |
| 2013/0162461 A1* | 6/2013 | Lucking | | G01S 15/878 342/70 |
| 2014/0118170 A1* | 5/2014 | Rozgonyi | | G08G 1/04 340/943 |
| 2015/0160658 A1* | 6/2015 | Reedman | | G05D 1/102 701/3 |
| 2015/0307091 A1* | 10/2015 | Gokan | | B60W 30/09 701/70 |
| 2016/0063861 A1* | 3/2016 | Lee | | G08G 1/14 340/932.2 |
| 2016/0291153 A1* | 10/2016 | Mossau | | G01S 15/931 |
| 2017/0106750 A1* | 4/2017 | Tauchi | | B60R 1/00 |

\* cited by examiner

FIG. 5

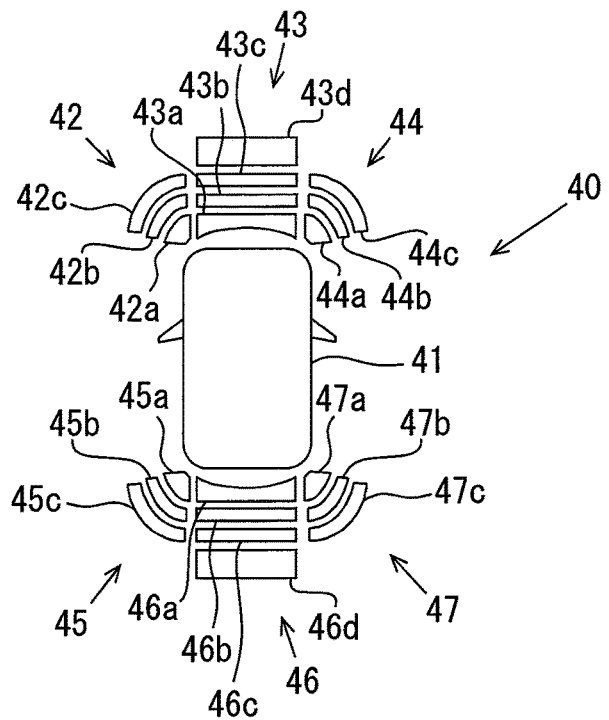

FIG. 6

| NOTIFICATION AREA | APPLICABLE ULTRASONIC SENSOR 10c | ADJACENT ULTRASONIC SENSOR 10n | CANDIDATE DISTANCE | DETERMINATION CONDITION | EXCEPTION CONDITION |
|---|---|---|---|---|---|
| LEFT REAR NOTIFICATION AREA | 10RL | 10RLC | APPLICABLE DIRECT WAVE DISTANCE (D1) | - | - |
| | | | FIRST INDIRECT WAVE DISTANCE (D2), SECOND INDIRECT WAVE DISTANCE (D3) | APPLICABLE DIRECT WAVE DISTANCE (D1) PRESENT OR ADJACENT DIRECT WAVE DISTANCE (D4) ABSENT | APPLICABLE DIRECT WAVE DISTANCE (D1) ABSENT AND ADJACENT DIRECT WAVE DISTANCE (D4) PRESENT |

FIG. 7

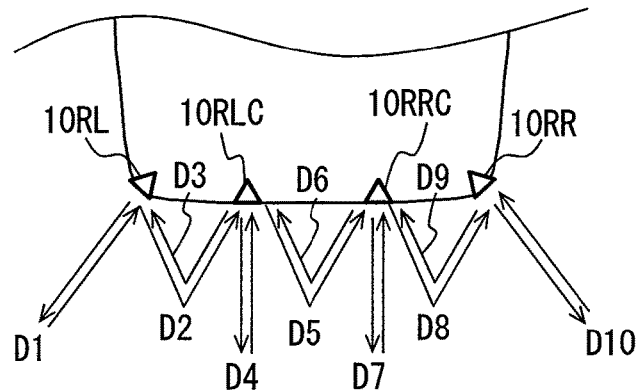

FIG. 8

| NOTIFICATION AREA | APPLICABLE ULTRASONIC SENSOR 10c | ADJACENT ULTRASONIC SENSOR 10n | CANDIDATE DISTANCE | DETERMINATION CONDITION | EXCEPTION CONDITION |
|---|---|---|---|---|---|
| CENTER REAR NOTIFICATION AREA | 10RLC 10RRC | 10RL 10RR | APPLICABLE DIRECT WAVE DISTANCE (D4), APPLICABLE DIRECT WAVE DISTANCE (D7), IN-AREA INDIRECT WAVE DISTANCES (D5), (D6) | - | - |
| | | | FIRST INDIRECT WAVE DISTANCE (D3), SECOND INDIRECT WAVE DISTANCE (D2) | APPLICABLE DIRECT WAVE DISTANCE (D4): PRESENT OR ADJACENT DIRECT WAVE DISTANCE (D1): ABSENT | APPLICABLE DIRECT WAVE DISTANCE (D4): ABSENT AND ADJACENT DIRECT WAVE DISTANCE (D1): PRESENT |
| | | | FIRST INDIRECT WAVE DISTANCE (D8), SECOND INDIRECT WAVE DISTANCE (D9) | APPLICABLE DIRECT WAVE DISTANCE (D7): PRESENT OR ADJACENT DIRECT WAVE DISTANCE (D10): ABSENT | APPLICABLE DIRECT WAVE DISTANCE (D7): ABSENT AND ADJACENT DIRECT WAVE DISTANCE (D10): PRESENT |

OBSTACLE DETECTION APPARATUS FOR VEHICLES

CROSS REFERENCE TO RELATED APPLICATION

This application is based on Japanese Patent Application No. 2014-215720 filed on Oct. 22, 2014, the disclosure of which is incorporated herein by reference.

TECHNICAL FIELD

The present disclosure relates to an obstacle detection apparatus for vehicles that detects an obstacle by transmitting and receiving an ultrasonic wave.

BACKGROUND ART

An obstacle detection apparatus for vehicles that detects an obstacle by transmitting and receiving an ultrasonic wave includes a plurality of ultrasonic sensors arranged at several different parts of the vehicle. In Patent Literature 1, each ultrasonic sensor detects the distance to an obstacle, and when the distance becomes a preset value or lower, a notifier notifies the direction in which the obstacle is located. When a sensor on the front right of the vehicle alone detects an obstacle, the control device controls the notifier to illuminate an indicator indicative of front right.

When an obstacle detection apparatus including a plurality of ultrasonic sensors is applied to a vehicle, it is desirable that the boundary of the notification range be close to parallel to the surface of the vehicle where the ultrasonic sensors are provided (hereinafter, sensor attachment surface). For this, an object could be detected based on reception of a reflection wave, which is generated by an ultrasonic wave transmitted from another ultrasonic sensor and reflected by the object. Hereinafter, a reflection wave of an ultrasonic wave transmitted from another ultrasonic sensor and reflected by the object will be referred to as "indirect wave", whereas a reflection wave of an ultrasonic wave transmitted from one's ultrasonic sensor and reflected by the object will be referred to as direct wave. An ultrasonic wave transmitted from the ultrasonic sensor will be referred to as transmission wave.

The boundary of the notification range of each ultrasonic sensor is a circular arc. Therefore, in an area where the boundaries of the notification ranges of two adjacent ultrasonic sensors overlap each other, the distance from the vehicle's sensor attachment surface to the boundary of the notification range is shorter than the distance straight ahead from the ultrasonic sensor to the boundary of the notification range.

If, however, the object is detected by receiving an indirect wave, the linear distance from the sensor attachment surface to the boundary of the notification range of indirect waves is the longest at the midpoint between two ultrasonic sensors adjacent each other. Therefore, by superposing the notification range of indirect waves on the notification range of direct waves, the boundaries of the superposed notification ranges will be close to parallel to the sensor attachment surface.

On the other hand, if indirect waves are to be received, the direction corresponding to an ultrasonic sensor that transmitted the transmission wave, and the direction corresponding to an ultrasonic sensor that received the indirect wave, could be determined as the direction in which an obstacle is present. Since both of these directions are different from the direction in which the obstacle is actually present, it may cause a feeling of discomfort to the passenger of the vehicle.

PRIOR ART LITERATURES

Patent Literature

Patent Literature 1: JP 3550322 B2

SUMMARY OF INVENTION

It is an object of the present disclosure to provide an obstacle detection apparatus for vehicles, wherein the variation in distance from the sensor attachment surface of the vehicle to the boundary of the notification range depending on the distance to the ultrasonic sensor is reduced, and there is less inconsistency in the notification contents indicating the direction in which an obstacle is detected.

According to an aspect of the present disclosure, an obstacle detection apparatus for vehicles is mounted to a vehicle and includes: a first ultrasonic sensor that is arranged at a predetermined part of the vehicle to detect a distance to an obstacle by transmitting and receiving an ultrasonic wave; a second ultrasonic sensor that is arranged at a position of the vehicle where the second ultrasonic sensor receives a reflection wave of an ultrasonic wave transmitted from the first ultrasonic wave and reflected by the obstacle to detect a distance to the obstacle by transmitting and receiving an ultrasonic wave; a notifier that gives a notification of detecting the obstacle present within a preset distance in one or more of predetermined notification areas including a first notification area indicative of a range where the first ultrasonic sensor detects the obstacle for the vehicle, and a second notification area being different from the first notification area and indicative of a range where the second ultrasonic sensor detects the obstacle for the vehicle; and a controller that controls contents to be notified by the notifier. Furthermore, the controller determines whether a first indirect wave distance and a second indirect wave distance are used to determine whether to give the notification of detecting the obstacle in the first notification area based on a first direct wave distance and a second direct wave distance; the first indirect wave distance is a distance to the obstacle calculated from an ultrasonic wave, which is transmitted from the first ultrasonic sensor and received by the second ultrasonic sensor; the second indirect wave distance is a distance to the obstacle calculated from an ultrasonic wave, which is transmitted from the second ultrasonic sensor and received by the first ultrasonic sensor; the first direct wave distance is a distance to the obstacle calculated by the first ultrasonic sensor from an ultrasonic wave, which is transmitted and received by the first ultrasonic sensor; and the second direct wave distance is a distance to the obstacle calculated by the second ultrasonic sensor from an ultrasonic wave, which is transmitted and received by the second ultrasonic sensor.

According to one aspect of the present disclosure, a first indirect wave distance, which is a distance to the obstacle calculated from the ultrasonic wave that is transmitted from the first ultrasonic sensor and received by the second ultrasonic sensor, and a second indirect wave distance, which is a distance to the obstacle calculated from the ultrasonic wave that is transmitted from the second ultrasonic sensor and received by the first ultrasonic sensor, are used for the determination of whether to give a notification of obstacle detection in the first notification area. This way, a notification of obstacle detection can be given based on reception of an indirect wave, so that the notification range boundary can be set as close to parallel to the sensor attachment surface of the vehicle.

Whether the first indirect wave distance and the second indirect wave distance are to be used for the determination of whether to give a notification of obstacle detection in the first notification area is determined based on a first direct wave distance, which is a distance to the obstacle calculated by the first ultrasonic sensor from the ultrasonic wave that is transmitted and received by the first ultrasonic sensor, and a second direct wave distance, which is a distance to the obstacle calculated by the second ultrasonic sensor from the ultrasonic wave that is transmitted and received by the second ultrasonic sensor.

If the second ultrasonic sensor has received a direct wave, the obstacle is considered to be present in a second notification area, so that the second direct wave distance is not directly relevant to the first notification area. Even so, when one of the first ultrasonic sensor and the second ultrasonic sensor is receiving an indirect wave from the other, it is highly likely that the obstacle is partly present between the first ultrasonic sensor and the second ultrasonic sensor.

By using the first direct wave distance and the second direct wave distance calculated based on direct waves received respectively by the first ultrasonic sensor and the second ultrasonic sensor associated with the first and second indirect wave distances, it can be determined whether the obstacle is nearer to the first ultrasonic sensor, or nearer to the second ultrasonic sensor. Based on this determination, it is determined whether the first indirect wave distance and second indirect wave distance are to be used for the determination of whether to give a notification of obstacle detection in the first notification area. This way, issuance of a notification of obstacle detection in the first notification area when the obstacle is actually present in the second notification area, or a failure to give a notification of obstacle detection in the first notification area when the obstacle is present in the first notification area, are prevented. Thus there are fewer instances of inconsistency in the notified contents that indicate the direction in which the obstacle is detected.

Moreover, there is an advantage that calculations are simpler as compared to determining the direction of an obstacle with the use of a triangulation method. Since the controller does not need to perform processing at very high speed, the apparatus can be configured at lower cost.

BRIEF DESCRIPTION OF DRAWINGS

The above and other objects, features and advantages of the present disclosure will become more apparent from the following detailed description made with reference to the accompanying drawings. In the drawings:

FIG. 5 is a diagram showing an obstacle position notification image;

FIG. 6 is a diagram showing candidate distances and determination conditions specifically in the case with a left rear notification area;

FIG. 7 is a diagram showing the distances referred to in FIG. 6 and FIG. 8;

FIG. 8 is a diagram showing candidate distances and determination conditions specifically in the case with a center rear notification area;

EMBODIMENTS FOR CARRYING OUT INVENTION

Figure 1:
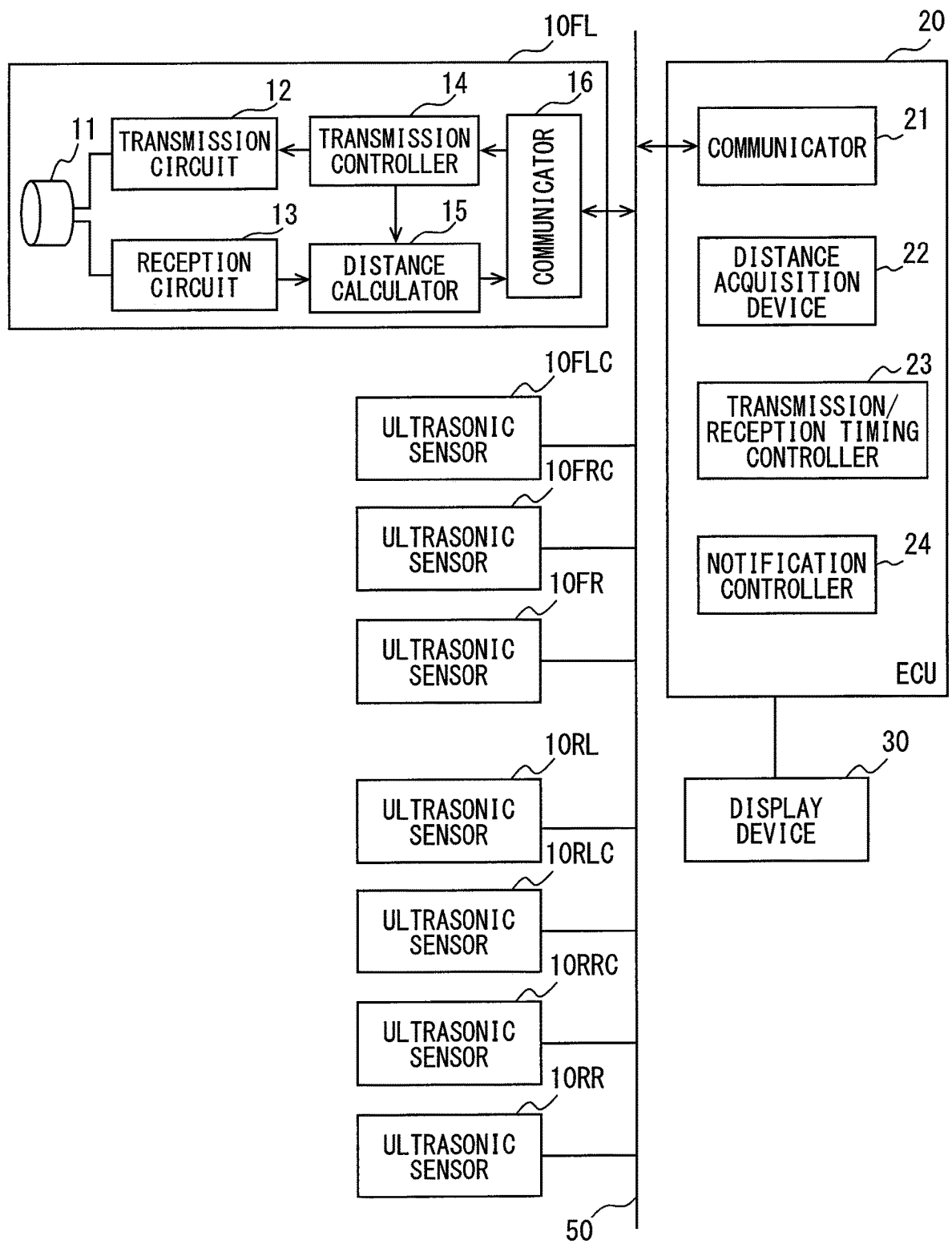
FIG. 1 is a configuration diagram showing an obstacle detection apparatus for vehicles of one embodiment.
Figure 2:
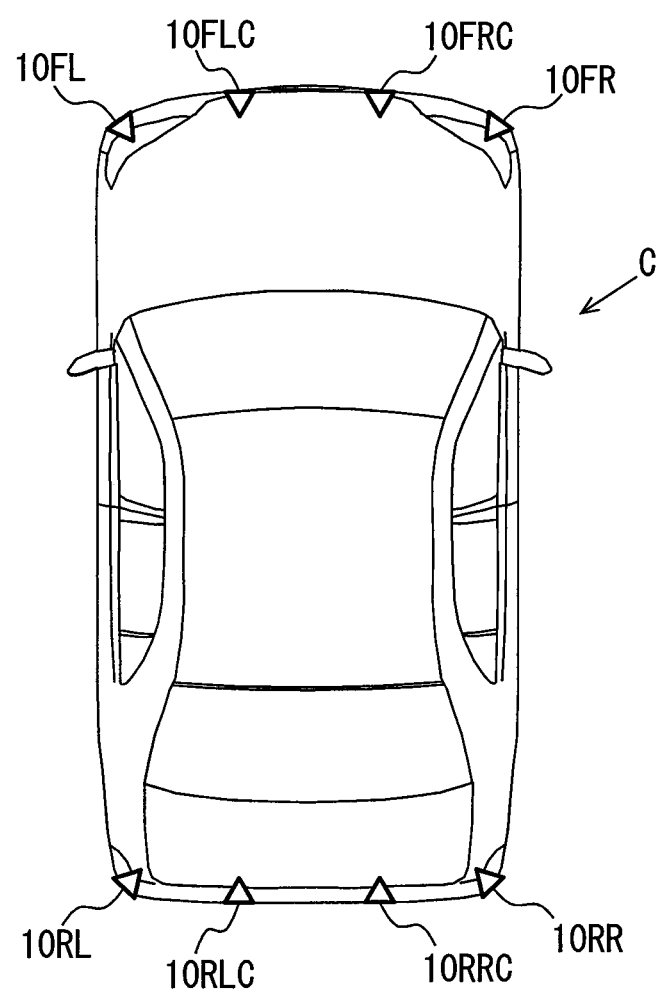
FIG. 2 is a diagram showing the positions where ultrasonic sensors are attached.

An embodiment of the present disclosure will be hereinafter described with reference to the drawings. An obstacle detection apparatus for vehicles 1 shown in FIG. 1 includes an ultrasonic sensor 10, an ECU 20, and a display device 30. There are provided eight ultrasonic sensors 10. These eight ultrasonic sensors 10 are provided on the front end face and rear end face of a vehicle C as shown in FIG. 2, four each on either end.

More specifically, ultrasonic sensors 10FL, 10FLC, 10FRC, and 10FR are provided on the front end face of the vehicle C, at the left corner, on the left side in the center part, on the right side in the center part, and at the right corner, respectively. Ultrasonic sensors 10RL, 10RLC, 10RRC, and 10RR are provided on the rear end face of the vehicle C, at the left corner, on the left side in the center part, on the right side in the center part, and at the right corner, respectively. When it is not particularly necessary to distinguish these eight ultrasonic sensors 10FL, 10FLC, 10FRC, 10FR, 10RL, 10RLC, 10RRC, and 10RR, they will be referred to simply as ultrasonic sensor 10.

(Configuration of Ultrasonic Sensor 10)

The ultrasonic sensor 10 includes a transceiver 11, a transmission circuit 12, a reception circuit 13, a transmission controller 14, a distance calculator 15, and a communicator 16.

The transceiver 11 generates a wave that is an ultrasonic wave and transmits this wave, as well as receives an ultrasonic wave coming from outside. The transceiver then outputs a signal indicative of the intensity of the received ultrasonic wave to the reception circuit 13. The ultrasonic waves received by the transceiver 11 include a reflection wave of a transmission wave reflected by an object outside.

The transmission circuit 12 generates a pulse signal when a transmission instruction signal is input from the transmission controller 14, and outputs this pulse signal to the transceiver 11. The transceiver 11 is activated by this pulse signal and transmits waves in pulses.

The reception circuit 13 amplifies and performs A/D conversion on the signal input from the transceiver 11, and outputs a signal after the amplification and A/D conversion (hereinafter, reflection wave signal) to the distance calculator 15.

The transmission controller 14 outputs a transmission instruction signal to the transmission circuit 12 when the transmission controller 14 acquires the transmission instruction signal transmitted from the ECU 20 from the communicator 16. The transmission controller 14 also notifies the distance calculator 15 that the transmission controller 14 has output a transmission instruction signal. The transmission controller 14 may also acquire a reception instruction signal from the ECU 20. The reception instruction signal is a signal that causes reception only to be performed without the transmission of a wave. At this time, an adjacent ultrasonic sensor 10 is transmitting a wave. The transmission controller 14 also notifies the distance calculator 15 of the acquisition of this reception instruction signal when the transmission controller 14 acquires this reception instruction signal.

The distance calculator 15 calculates a distance to an object from a time interval from when the transceiver 11 in the same ultrasonic sensor 10 as this distance calculator 15, or the transceiver 11 of an adjacent ultrasonic sensor 10 transmits a wave, to when a reflection wave is received with an intensity of not less than an object detection threshold.

The time point when the transceiver 11 transmits a wave is the time point when it receives a notification from the transmission controller 14 that a transmission instruction signal has been output, or a reception instruction signal has been acquired. The time point when a reflection wave is received with an intensity of not less than an object detection threshold is the time point when the reflection wave signal exceeds the object detection threshold for the first time during a reflection wave detection period that starts after a predetermined time from the transmission of a wave. This time interval multiplied by the speed of sound and divided by two is the distance to the object. The distance determined by the distance calculator 15 will be hereinafter referred to as detected distance.

The upper limit of the detected distance is several meters or more (not more than 10 m). The intensity of the wave the transceiver 11 transmits and the gain of the reception circuit 13 are set such that an obstacle positioned at the upper limit of the detected distance can be detected. When the upper limit of the detected distance is set to several meters or more, the ultrasonic sensors 10 adjacent each other on the front end face and rear end face are spaced from each other a distance not more than the upper limit of the detected distance. Therefore, each ultrasonic sensor 10 is capable of receiving a reflection wave of a wave transmitted from an adjacent ultrasonic sensor 10 and reflected by an obstacle, i.e., an indirect wave.

The communicator 16 transmits the detected distance determined by the distance calculator 15 to a communicator 21 of the ECU 20 via a LIN bus 50. The communicator 16 receives transmission instruction signals and reception instruction signals transmitted from the communicator 21 of the ECU 20, and outputs the transmission instruction signals and reception instruction signals to the transmission controller 14.

(Configuration of ECU 20)

The ECU 20 includes the communicator 21, a distance acquisition unit 22, a transmission/reception timing controller 23, and a notification controller 24. This ECU 20 is a known circuit configuration that includes a CPU, ROM, RAM, I/O interface, and the like. The CPU executes programs stored in the ROM so that the ECU 20 functions as the distance acquisition unit 22, transmission/reception timing controller 23, and notification controller 24. Some or all of the functions executed by the ECU 20 may be configured as hardware with one or a plurality of ICs or the like.

The communicator 21 is a communication interface and communicates with the ultrasonic sensor 10 via the LIN bus 50. The ECU 20 is also connected to the display device 30.

The distance acquisition unit 22 acquires detected distances determined by respective distance calculators 15 of the eight ultrasonic sensors 10FL, 10FLC, 10FRC, 10FR, 10RL, 10RLC, 10RRC, and 10RR via the communicator 21 and LIN bus 50.

The transmission/reception timing controller 23 controls the timing at which a transmission wave is transmitted from the ultrasonic sensor 10, and the timing of receiving a reflection wave. The process this transmission/reception timing controller 23 performs will be described later with reference to FIG. 4.

The notification controller 24 controls the displayed contents of an obstacle position notification image 40 (see FIG. 5) displayed in the display device 30 based on the detected distances acquired from the eight ultrasonic sensors 10FL, 10FLC, 10FRC, 10FR, 10RL, 10RLC, 10RRC, and 10RR. The notification controller 24 corresponds to the controller. The process performed by this notification controller 24 will also be described later with reference to FIG. 4.

(Display Device 30)

The display device 30 corresponds to the notifier. The display device 30 is arranged at a position where it is visible from the driver in the interior of the vehicle C, and displays the obstacle position notification image 40 shown in FIG. 5. This obstacle position notification image 40 includes a figure of a vehicle 41 representing the vehicle C at the center of the obstacle position notification image 40. A left front notification area graphic 42, a center front notification area graphic 43, a right front notification area graphic 44, a left rear notification area graphic 45, a center rear notification area graphic 46, and a right rear notification area graphic 47 are arranged around the figure of the vehicle 41.

One or a plurality of these notification area graphics 42 to 47 corresponding to the direction(s) of a detected obstacle is (are) illuminated to notify a passenger of the vehicle C of the direction where the obstacle is detected.

The left front notification area graphic 42 includes three distance notification graphics 42a, 42b, and 42c arranged in increasing distance from the figure of the vehicle 41. The notification area graphics 44, 45, and 47 corresponding to other corners similarly include three distance notification graphics 44a, 44b, 44c, 45a, 45b, 45c, 47a, 47b, and 47c. The center front notification area graphic 43 and center rear notification area graphic 46 include four distance notification graphics 43a, 43b, 43c, 43d, 46a, 46b, 46c, and 46d arranged in increasing distance from the figure of the vehicle 41. These distance notification graphics are selectively illuminated to indicate the distance to the obstacle.

(Process Executed by Ultrasonic Sensor 10)

Figure 3:
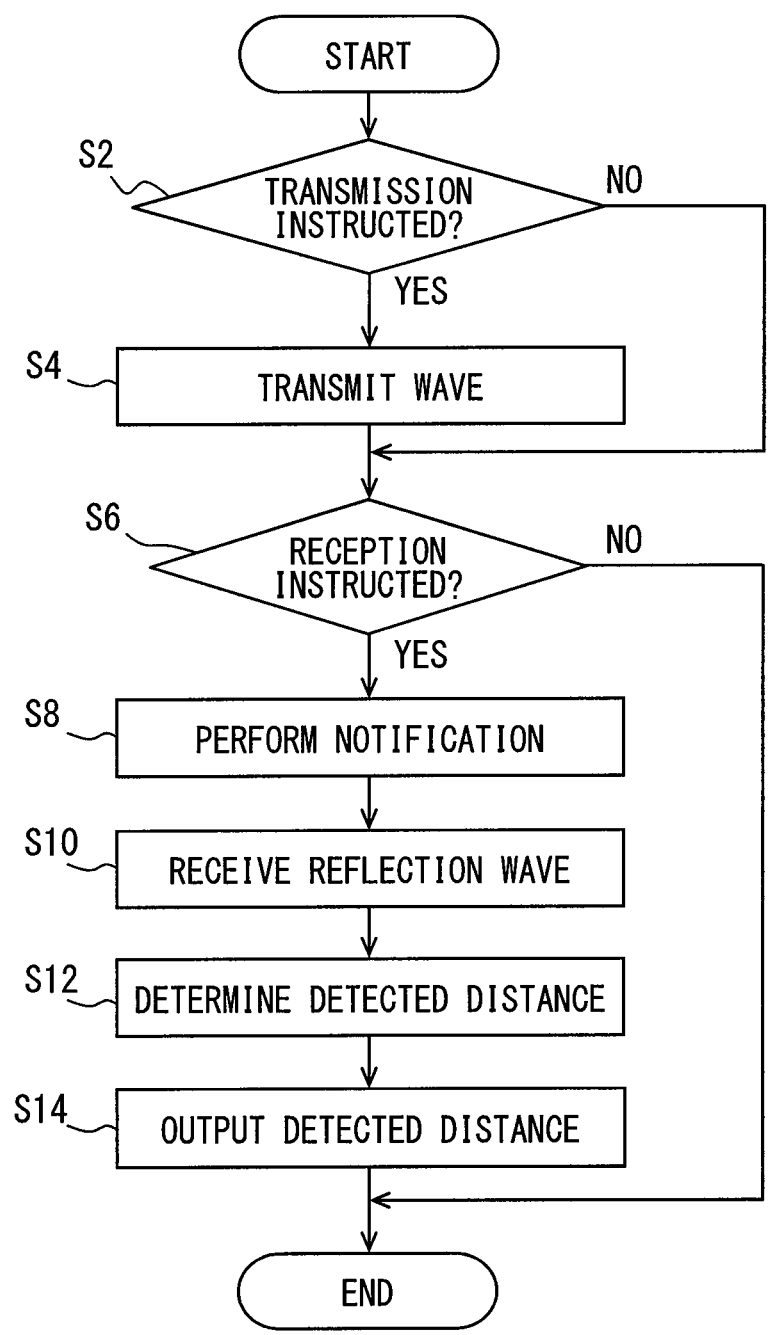
FIG. 3 is a flowchart showing a process executed by an ultrasonic sensor.

Next, the flow of the process executed by each ultrasonic sensor 10 will be described with reference to FIG. 3. The ultrasonic sensor 10 executes this process shown in FIG. 3 repeatedly, for example, during power application. In FIG. 3, steps S2 to S8 are performed by the transmission controller 14, step S10 is performed by the reception circuit 13, and steps S12 and S14 are performed by the distance calculator 15.

At step S2, it is determined whether a transmission instruction signal output by the transmission/reception timing controller 23 of the ECU 20 has been acquired via the communicator 16. If the determination is NO, the process goes to step S6, whereas, if YES, the process goes to step S4.

At step S4, a wave is transmitted from the transceiver 11. Namely, a transmission instruction signal is output to the transmission circuit 12. When a transmission instruction signal is input, the transmission circuit 12 generates a pulse signal, and outputs this pulse signal to the transceiver 11. Thus waves are transmitted in pulses from the transceiver 11.

At step S6, it is determined whether a reception instruction signal has been acquired. Since the reception instruction signal is always transmitted with the transmission instruction signal, the reception instruction signal need not necessarily be transmitted, and the ECU 20 may interpret the transmission instruction signal as the reception instruction signal to make the determination at step S6 and other decisions.

If the determination at step S6 is NO, the process in FIG. 3 is ended, whereas, if YES, the process goes to step S8. At step S8, the distance calculator 15 is notified that a transmission instruction signal or a reception instruction signal has been acquired.

At step S10, ultrasonic waves are received for a certain period of time. At step S12, the time interval from when a wave is transmitted to when the intensity of a reflection wave exceeded an object detection threshold is determined, and this time interval is multiplied by the speed of sound and divided by two, to produce a detected distance. If a reflection wave with an intensity of not less than the object detection threshold is not detected, the detected distance is not produced. At step S14, if a detected distance has been acquired at step S12, this detected distance is output to the ECU 20.

(Process Executed by ECU 20)

Figure 4:
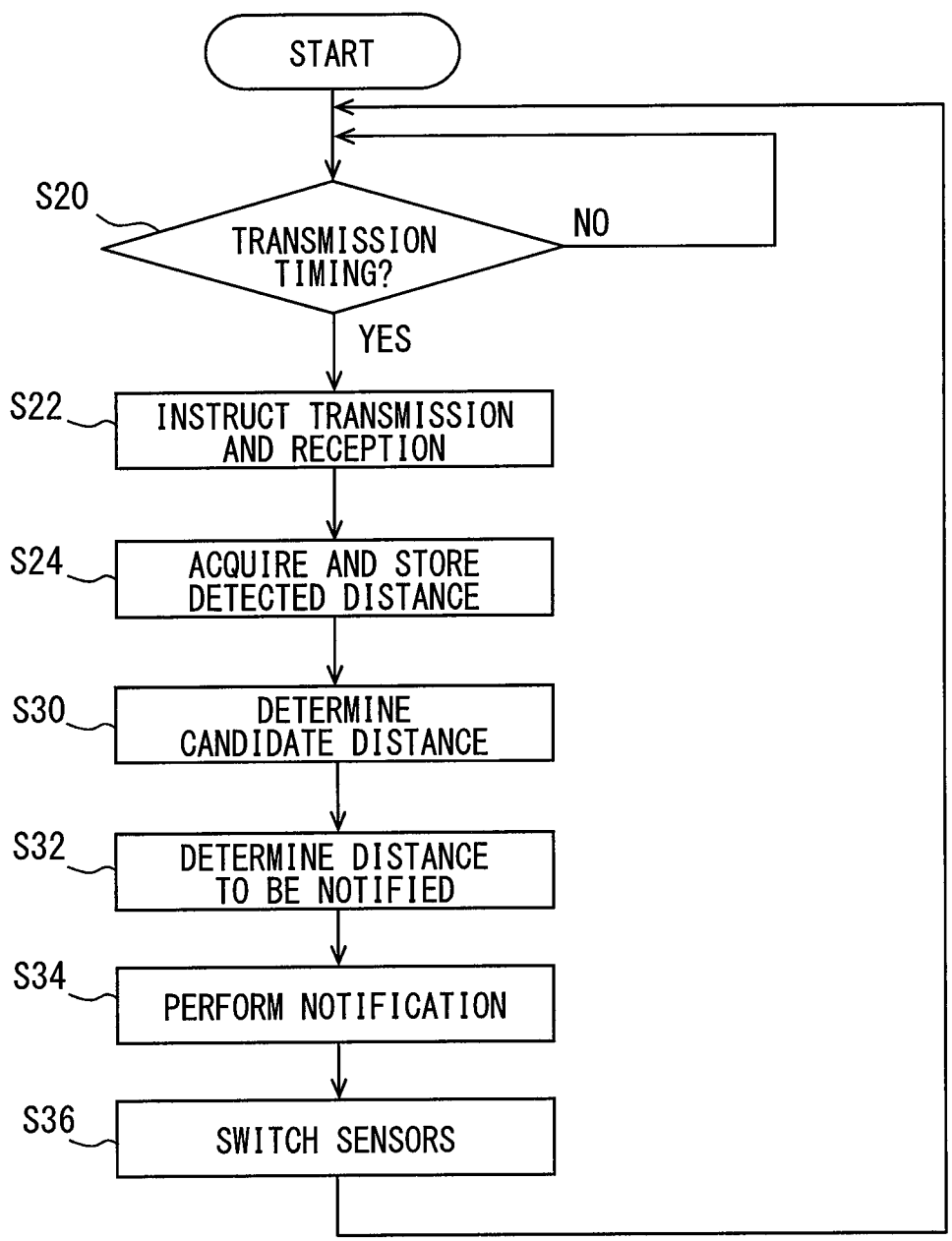
FIG. 4 is a flowchart showing a process executed by an ECU.

Next, the flow of the process executed by the ECU 20 will be described with reference to FIG. 4. This process shown in FIG. 4 is executed repeatedly when an obstacle detection condition is established. The obstacle detection condition is a condition that the vehicle speed is less than a certain value, for example. The certain value of vehicle speed is 30 km/h, for example.

In the process of FIG. 4, steps S20, S22, and S36 are executed by the transmission/reception timing controller 23, step S24 is executed by the distance acquisition unit 22, and steps S30 to S34 are executed by the notification controller 24.

At step S20, it is determined whether the transmission timing at which a wave is to be transmitted from one of the ultrasonic sensors 10 has been arrived at. In the present embodiment, the transmission timing for the ultrasonic sensors 10FL, 10FLC, 10FRC, and 10FR arranged at the front end face of the vehicle C is controlled separately from the transmission timing for the ultrasonic sensors 10RL, 10RLC, 10RRC, and 10RR arranged at the rear end face. Therefore, whether the transmission timing has been arrived at in the ultrasonic sensors 10FL, 10FLC, 10FRC, and 10FR on the front end face, and whether the transmission timing has been arrived at in the ultrasonic sensors 10RL, 10RLC, 10RRC, and 10RR on the rear end face, are determined separately. The process from steps S22 to S28 is also performed separately for the ultrasonic sensors 10FL, 10FLC, 10FRC, and 10FR on the front end face, and for the ultrasonic sensors 10RL, 10RLC, 10RRC, and 10RR on the rear end face.

The transmission timing is determined based on the transmission/reception period of each ultrasonic sensor 10. The transmission/reception period of one ultrasonic sensor 10 is a preset period of, for example, several tens msec to several hundreds msec. If the determination at step S20 is NO, step S20 is executed repeatedly, whereas, if YES, the process goes to step S22.

At step S22, a transmission instruction signal and a reception instruction signal are output to the ultrasonic sensor 10. More specifically, a transmission instruction signal and a reception instruction signal are output to an ultrasonic sensor 10 where the transmission timing is arrived at. A reception instruction signal is output to ultrasonic sensor(s) 10 adjacent to the ultrasonic sensor 10 where the transmission timing is arrived at.

Therefore, if the transmission timing has been arrived at the ultrasonic sensor 10FL arranged at the left front corner, a transmission instruction signal and a reception instruction signal are transmitted to the ultrasonic sensor 10FL at the left front corner, while a reception instruction signal is transmitted to the ultrasonic sensor 10FLC on the left in the front central part.

If the transmission timing has been arrived at the ultrasonic sensor 10FLC arranged at the left in the front central part, a transmission instruction signal and a reception instruction signal are transmitted to this ultrasonic sensor 10FLC. A reception instruction signal is transmitted to the ultrasonic sensor 10FL at the left front corner, and to the ultrasonic sensor 10FRC on the right side in the front central part.

At step S24 that follows, if the ultrasonic sensor 10 to which the reception instruction signal is output has produced a detected distance, this detected distance is acquired. The detected distance acquired from the ultrasonic sensor 10 to which the transmission instruction signal is transmitted is a detected distance determined from a direct wave. On the other hand, the detected distance acquired from the ultrasonic sensor 10 to which only the reception instruction signal is transmitted is a detected distance determined from an indirect wave.

At step S30, a detected distance used for determining a distance to be notified is determined for each of the notification areas. In the present embodiment, the distance to be notified is the minimum value of detected distances determined to be used for determining the distance to be notified. Therefore, a detected distance determined to be used for determining the distance to be notified is set as a candidate for the distance to be notified. Hereinafter, the detected distance determined to be used for determining the distance to be notified will be referred to as candidate distance.

For all the notification areas, the detected distances calculated from direct waves by ultrasonic sensors 10 corresponding notification areas are included in the candidate distances. The notification areas are six areas corresponding to the six notification area graphics 42 to 47. Thus the notification area graphics 42 to 47 are each associated with corresponding ultrasonic sensors 10.

The ultrasonic sensor 10FL arranged at the left corner on the front end face of the vehicle C is associated with the left front notification area graphic 42, and the two ultrasonic sensors 10FLC and 10FRC arranged at the central part on the front end face of the vehicle C are associated with the center front notification area graphic 43. The ultrasonic sensor 10FR arranged at the right corner on the front end face of the vehicle C is associated with the right front notification area graphic 44. The ultrasonic sensor 10RL arranged at the left corner on the rear end face of the vehicle C is associated with the left rear notification area graphic 45, and the two ultrasonic sensors 10RLC and 10RRC arranged at the central part on the rear end face of the vehicle C are associated with the center rear notification area graphic 46. The ultrasonic sensor 10RR arranged at the right corner on the rear end face of the vehicle C is associated with the right rear notification area graphic 47.

When an indirect wave is received, the process will be different depending on whether the ultrasonic sensor 10 that transmitted the ultrasonic wave and the sensor that received the ultrasonic wave are both associated with one notification area, or one of the sensors is associated with a different notification area from the notification area for which a candidate distance is being determined. The notification area for which a candidate distance is being determined corresponds to the first notification area, and a notification area adjacent to the notification area for which a candidate distance is being determined corresponds to the second notification area.

The indirect wave here refers only to an indirect wave when at least one of the ultrasonic sensors 10 that transmitted the ultrasonic wave and received the ultrasonic wave is associated with the notification area for which a candidate distance is to be determined.

In the former case, i.e., if the ultrasonic sensors 10 that transmitted the ultrasonic wave and received the ultrasonic wave are both associated with one notification area, a detected distance determined from an indirect wave is used as the candidate distance. This is because this indirect wave can be considered the same as a direct wave in respect that an ultrasonic sensor 10 corresponding to a notification area is receiving an ultrasonic wave that is transmitted from an ultrasonic sensor 10 corresponding to that notification area.

In the latter case, whether the detected distance is to be set as the candidate distance is determined based on the following first and second determination conditions.

The first determination condition requires that an ultrasonic sensor 10 corresponding to the notification area for which a candidate distance is being determined has calculated a direct wave distance. Hereinafter, the ultrasonic sensor 10 corresponding to the notification area for which a candidate distance is being determined will be referred to as applicable ultrasonic sensor 10c. A direct wave distance is a detected distance determined by the applicable ultrasonic sensor 10c from a direct wave. The direct wave distance determined by the applicable ultrasonic sensor 10c will be referred to as applicable direct wave distance.

The second determination condition requires that an ultrasonic sensor 10 as not corresponding to the notification area for which a candidate distance is being determined has not calculated a direct wave distance of not more than a preset value. The preset value is a distance set as an upper limit distance for notification of detection of an obstacle. Hereinafter, the ultrasonic sensor 10 adjacent to the applicable ultrasonic sensor 10c and not corresponding to the notification area for which a candidate distance is being determined will be referred to as adjacent ultrasonic sensor 10n. The applicable ultrasonic sensor 10c corresponds to the first ultrasonic sensor, and the adjacent ultrasonic sensor 10n corresponds to the second ultrasonic sensor. The applicable direct wave distance corresponds to the first direct wave distance, and the adjacent direct wave distance corresponds to the second direct wave distance.

When one of the first determination condition and the second determination condition is established, the detected distance determined from an indirect wave (hereinafter, indirect wave distance) is set as the candidate distance. When neither the first determination condition nor the second determination condition is established, the indirect wave distance is not set as the candidate distance.

(Specific Examples of Candidate Distances and Determination Conditions)

The description above will be elaborated below, with reference to the left rear notification area and center rear notification area as specific examples of notification areas. As shown in FIG. 6, the applicable ultrasonic sensor 10c of the left rear notification area is the ultrasonic sensor 10RL, and the adjacent ultrasonic sensor 10n is the ultrasonic sensor 10RLC. The candidate distances are: applicable direct wave distance (D1), first indirect wave distance (D2), and second indirect wave distance (D3). The parenthesized reference symbols of the applicable direct wave distance, first indirect wave distance, and second indirect wave distance indicate which of the distances D1 to D10 shown in FIG. 7 they are.

The applicable direct wave distance (D1) is a direct wave distance determined by the ultrasonic sensor 10RL as the applicable ultrasonic sensor 10c corresponding to this left rear notification area. The first indirect wave distance (D2) is a distance calculated from an indirect wave, which is transmitted from the ultrasonic sensor 10RL as the applicable ultrasonic sensor 10c of the left rear notification area, and received by the ultrasonic sensor 10RLC as the adjacent ultrasonic sensor 10n. Conversely, the second indirect wave distance (D3) is a distance calculated from an indirect wave, which is received by the ultrasonic sensor 10RL that is the applicable ultrasonic sensor 10c, and transmitted from the ultrasonic sensor 10RLC that is the adjacent ultrasonic sensor 10n.

As shown in FIG. 6, the applicable direct wave distance (D1) is unconditionally set as a candidate distance. On the other hand, the first indirect wave distance (D2) and second indirect wave distance (D3) are set as candidate distances if the first indirect wave distance (D2) and second indirect wave distance (D3) satisfy a determination condition. The determination condition requires that either of the following first and second determination conditions be established: 1) An applicable direct wave distance (D1) has been calculated, and 2) an adjacent direct wave distance (D4) has not been calculated. In other words, as shown as exception condition in FIG. 6, if an applicable direct wave distance (D1) has not been calculated, and an adjacent direct wave distance (D4) has been calculated, then the first indirect wave distance (D2) and second indirect wave distance (D3) are not included in the candidate distances.

Next, candidate distances for the center rear notification area will be explained with reference to FIG. 8. There are two ultrasonic sensors 10RLC and 10RRC as the applicable ultrasonic sensors 10c of the center rear notification area. Therefore, as shown in FIG. 8, there are two applicable direct wave distances (D4) and (D7) as the candidate distances of the center rear notification area. Detected distances are also determined from indirect waves where the ultrasonic wave is transmitted from and received by the ultrasonic sensors 10RLC and 10RRC both associated with the center rear notification area. This detected distance will be hereinafter referred to as in-area indirect wave distance. As shown in FIG. 7 and FIGS. 8, D5 and D6 are in-area indirect wave distances for the center rear notification area. The applicable direct wave distances (D4) and (D7) and these in-area indirect wave distances (D5) and (D6) are unconditionally set as candidate distances.

The ultrasonic sensors 10RL and 10RR are the adjacent ultrasonic sensors 10n. Since there are two each applicable ultrasonic sensors 10c and adjacent ultrasonic sensors 10n, there are two each first indirect wave distances and second indirect wave distances. As shown in FIG. 8, the candidate distances of the center rear notification area include a first indirect wave distance (D3) and a second indirect wave distance (D2), where the applicable ultrasonic sensor 10c is the ultrasonic sensor 10RLC. The candidate distances also include a first indirect wave distance (D8) and a second indirect wave distance (D9), where the applicable ultrasonic sensor 10c is the ultrasonic sensor 10RRC.

The first indirect wave distances (D3) and (D8) and second indirect wave distances (D2) and (D9) are set as candidate distances if one of the first and second determination conditions is satisfied. The first determination condition on the first indirect wave distance (D3) and second indirect wave distance (D2) where the applicable ultrasonic sensor 10c is the ultrasonic sensor 10RLC is that an applicable direct wave distance (D4) has been calculated. The second determination condition is that an adjacent direct wave distance (D1) has not been calculated. In other words, as shown as an exception condition in FIG. 8, if an applicable direct wave distance (D4) has not been calculated, and an adjacent direct wave distance (D1) has been calculated, then the first indirect wave distance (D3) and second indirect wave distance (D2) are not included in the candidate distances.

On the other hand, the first determination condition on the first indirect wave distance (D8) and second indirect wave distance (D9) where the applicable ultrasonic sensor 10c is the ultrasonic sensor 10RRC is that an applicable direct wave distance (D7) has been calculated. The second determination condition is that an adjacent direct wave distance (D10) has not been calculated. In other words, as shown as an exception condition in FIG. 8, if an applicable direct wave distance (D7) has not been calculated, and an adjacent direct wave distance (D10) has been calculated, then the first indirect wave distance (D8) and second indirect wave distance (D9) are not included in the candidate distances.

At step S32, the minimum value of the candidate distances determined at step S30 for each notification area is determined as the distance to be notified of each notification area. At step S34, a notification is set as from the display device 30 in accordance with the distance to be notified determined at step S32.

At step S36, the ultrasonic sensor 10, which transmits a wave, is switched to a next ultrasonic sensor 10. The process is executed from step S20 onward to the next ultrasonic sensor 10. When all of the four ultrasonic sensors 10 on the front end face have transmitted a wave, the next ultrasonic sensor 10 is the ultrasonic sensor 10 of these four ultrasonic sensors 10 that is to transmit a wave first. Similarly, when all of the four ultrasonic sensors 10 on the end face have transmitted a wave, the next ultrasonic sensor 10 is the ultrasonic sensor 10 of these four ultrasonic sensors 10 that is to transmit a wave first.

First Display Example

Figure 9:
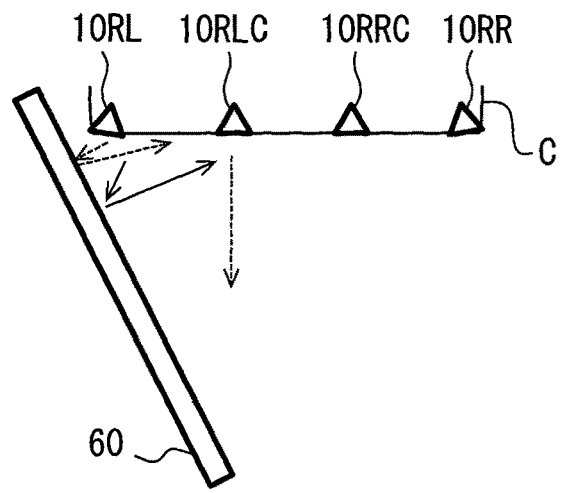
FIG. 9 is a diagram showing the positional relationship between a vehicle and a wall when a first display example is being presented.

Example displays of the obstacle position notification image 40 in the embodiment described above will be explained. In a first display example, as shown in FIG. 9, a wall 60 that is an obstacle is positioned diagonally behind on the left of the vehicle C. This wall 60 is oriented toward the widthwise center of the vehicle C as it is further away in the back of the vehicle C. In FIG. 9, the arrow with a broken line indicates that the reflection wave is not being received by any of the ultrasonic sensors 10. The arrow with a solid line, on the other hand, represents a reflection wave received by one of the ultrasonic sensors 10 or a transmission wave that is the origin of the reflection wave.

Thus, in the example of FIG. 9, neither of the ultrasonic sensors 10RL and 10RLC is receiving a direct wave. On the other hand, the ultrasonic sensor 10RLC is receiving an indirect wave originating from a transmission wave from the ultrasonic sensor 10RL.

In this situation, no applicable direct wave distance (D1) is calculated for the left rear notification area. Meanwhile, a first indirect wave distance (D2) is calculated. Since no adjacent direct wave distance (D4) is calculated, the second determination condition is established, so that the first indirect wave distance (D2) is set as a candidate distance. Therefore, a distance notification graphic 45c corresponding to the notified distance is illuminated in the left rear notification area graphic 45.

For the center rear notification area, a second indirect wave distance (D2) is calculated. Since the adjacent direct wave distance (D1) has not been calculated, the second determination condition is established. Therefore, the second indirect wave distance (D2) is set as a candidate distance. As a result, a distance notification graphic 46c corresponding to the notified distance is illuminated in the center rear notification area graphic 46.

If an indirect wave distance were to be set as a candidate distance for only a notification area corresponding to the ultrasonic sensor 10 that received the indirect wave, the left rear notification area graphic 45 will not be illuminated, even though there is the wall 60 on the left side in the back of the vehicle C, as shown in FIG. 9. In the present embodiment, however, the first indirect wave distance (D2) is also set as a candidate distance for the left rear notification area, so that the left rear notification area graphic 45 is illuminated when there is the wall 60 on the left side in the back of the vehicle C. Thus it will not cause a feeling of discomfort to the passenger of the vehicle who sees the obstacle position notification image 40.

Second Display Example

Figure 11:
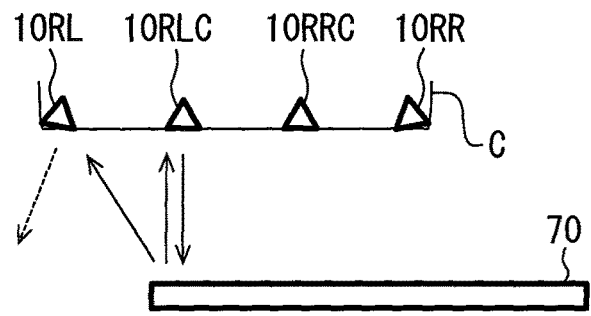
FIG. 11 is a diagram showing the positional relationship between a vehicle and a wall when a second display example is being presented.

In a second display example, as shown in FIG. 11, a wall 70 that is an obstacle extends from right behind the vehicle C diagonally to the right and back. The arrows in FIG. 11 bear the same meanings as those of FIG. 9. In the example of FIG. 11, while the ultrasonic sensor 10RL is not receiving a direct wave, the ultrasonic sensor 10RLC is receiving a direct wave. The ultrasonic sensor 10RL is receiving an indirect wave from the ultrasonic sensor 10RLC.

Figure 12:
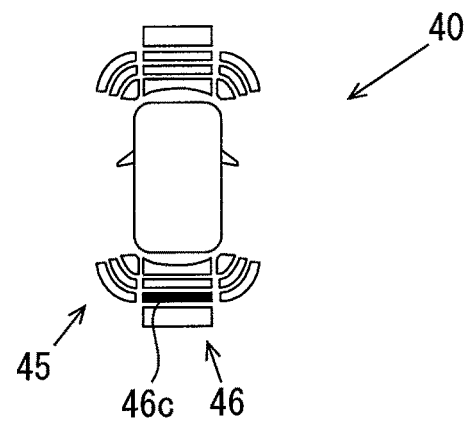
FIG. 12 is a diagram showing the second display example when the embodiment is applied.

In this situation, no applicable direct wave distance (D1) is calculated for the left rear notification area. Meanwhile, an adjacent direct wave distance (D4) is calculated. Since the exception condition is established, the first indirect wave distance (D2) and second indirect wave distance (D3) are excluded from candidate distances. As a result, the left rear notification area graphic 45 is not illuminated, as shown in FIG. 12.

For the center rear notification area, an applicable direct wave distance (D4) is calculated, and since this applicable direct wave distance (D4) is unconditionally set as a candidate distance, a distance to be notified is thus determined. Therefore, a distance notification graphic 46c corresponding to the notified distance is illuminated in the center rear notification area graphic 46.

If the first indirect wave distance (D2) and second indirect wave distance (D3) are unconditionally set as candidate distances for the left notification area, the left rear notification area graphic 45 will be illuminated, even though there is no wall 70 on the left side in the back of the vehicle C, as shown in FIG. 11. In the present embodiment, however, the determination condition is provided for determining when the first indirect wave distance (D2) and second indirect wave distance (D3) are to be set as candidate distances. Unless this determination condition is satisfied, these first indirect wave distance (D2) and second indirect wave distance (D3) are not set as candidate distances. This way, illumination of the left rear notification area graphic 45 when there is no wall 70 on the left side in the back of the vehicle C, which will cause a feeling of discomfort to the passenger of the vehicle who sees the obstacle position notification image 40, is prevented.

Third Display Example

Figure 13:
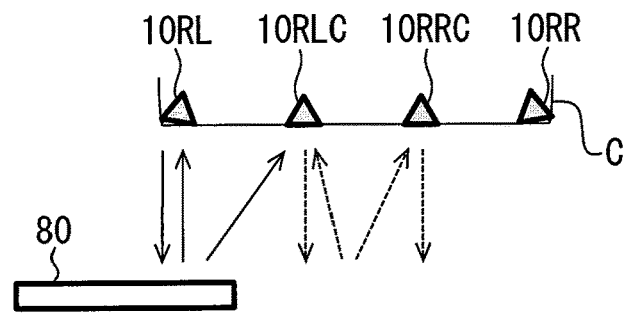
FIG. 13 is a diagram showing the positional relationship between a vehicle and a wall when a third display example is being presented.

In a third display example, as shown in FIG. 13, a wall 80 that is an obstacle is positioned diagonally behind on the left of the vehicle C. The arrows in FIG. 13 bear the same meanings as those of FIG. 9. In the example of FIG. 13, while the ultrasonic sensor 10RL is receiving a direct wave, the ultrasonic sensor 10RLC is not receiving a direct wave. However, the ultrasonic sensor 10RLC is receiving an indirect wave from the ultrasonic sensor 10RL.

Figure 14:
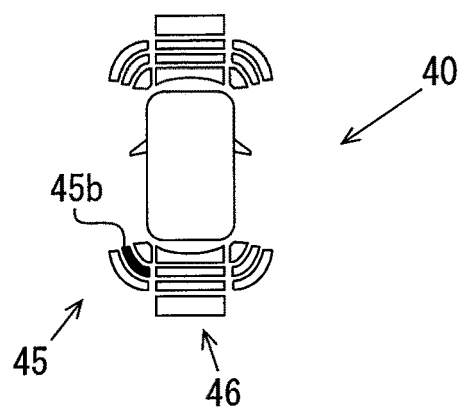
FIG. 14 is a diagram showing the third display example when the embodiment is applied.

In this situation, for the left rear notification area, an applicable direct wave distance (D1) is calculated, and since this applicable direct wave distance (D1) is unconditionally set as a candidate distance, a distance to be notified is thus determined. Therefore, as shown in FIG. 14, a distance notification graphic 45b corresponding to the notified distance is illuminated in the left rear notification area graphic 45.

For the center rear notification area, no applicable direct wave distances (D4) and (D7) are calculated, nor in-area indirect wave distances (D5) and (D6) are calculated. While a second indirect wave distance (D2) is calculated, the exception condition for this second indirect wave distance (D2) is established. That is, while no applicable direct wave distance (D4) is calculated, an adjacent direct wave distance (D1) is calculated. Therefore, the center rear notification area graphic 46 is not illuminated as shown in FIG. 14, so that illumination of the center rear notification area graphic 46 when there is no wall 80 right behind the vehicle C, which will cause a feeling of discomfort to the passenger of the vehicle who sees the obstacle position notification image 40, is prevented.

Effects of Embodiment

According to the embodiment described above, for the determination of whether to give a notification of detection of an obstacle in a notification area, i.e., for determining a distance to be notified for a notification area, a first indirect wave distance and a second indirect wave distance are included as candidate distances, which are candidates of the distance to be notified. This way, the boundary of the notification range can be set as close to parallel to the front or rear end face of the vehicle C that is the sensor attachment surface. In addition, the direction in which there is an obstacle that is oriented diagonally to the vehicle C, for example, as explained with the first display example of FIG. 10, can be indicated without causing a feeling of discomfort to the driver.

The first indirect wave distance and second indirect wave distance are set as candidate distances if a determination condition is established, while the first indirect wave distance and second indirect wave distance are not set as candidate distances if an exception condition is established. The determination condition is determined based on an applicable direct wave distance and an adjacent direct wave distance. The latter, i.e., the adjacent direct wave distance, is not directly relevant to the notification area for which the candidate distance is being determined. Even so, when one of an applicable ultrasonic sensor 10c and an adjacent ultrasonic sensor 10n is receiving an indirect wave from the other, it is highly likely that the obstacle is partly present between the applicable ultrasonic sensor 10c and the adjacent ultrasonic sensor 10n.

Therefore, a first direct wave distance and a second direct wave distance calculated based on direct waves received respectively by the applicable ultrasonic sensor 10c and the adjacent ultrasonic sensor 10n associated with the first and second indirect wave distances are used. Thereby, whether the obstacle is nearer to the applicable ultrasonic sensor 10c or to the adjacent ultrasonic sensor 10n can be determined. Based on this determination, it is determined whether the first indirect wave distance and second indirect wave distance are to be used for the determination of whether to give a notification that an obstacle is detected in the notification area for which a candidate distance is being determined.

This way, issuance of a notification that an obstacle is detected in the left rear notification area, when there is a wall 70 in the center rear notification area where an adjacent direct wave distance (D4) is calculated, is prevented, as explained with the second display example with respect to the left rear notification area. Similarly, issuance of a notification that an obstacle is detected in the left center rear notification area, when there is a wall 80 in the left rear notification area where an adjacent direct wave distance (D1) is calculated, is prevented, as explained with the third display example with respect to the center rear notification area.

Figure 10:
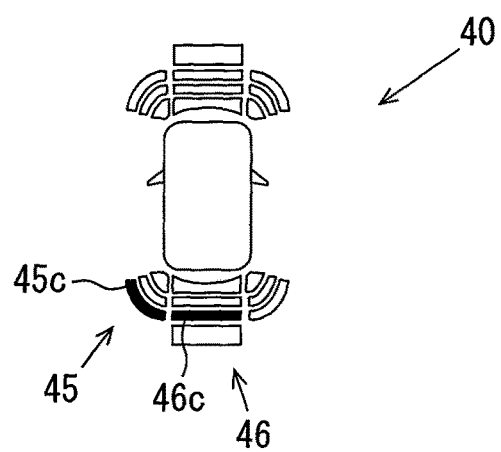
FIG. 10 is a diagram showing the first display example when the embodiment is applied.

As explained with the first display example of FIG. 10, a failure to give a notification that an obstacle is detected in the left rear notification area, when there is a wall 60 in the left rear notification area, is also prevented. Thus there are fewer instances of inconsistency in the notified contents that indicate the direction in which the obstacle is detected.

In the present embodiment, whether the first indirect wave distance and second indirect wave distance are to be set as candidate distances is determined based on whether an applicable direct wave distance is calculated, and whether an adjacent direct wave distance is calculated. This offers an advantage that calculations are simpler as compared to determining the direction of an obstacle with the use of a triangulation method.

While one embodiment of the present disclosure has been described above, the present disclosure is not limited to the embodiment described above and its technical scope includes the following variations. The disclosure can be embodied with various changes other than those described below without departing from the scope of the subject matter. In the following description, the elements given the same reference numerals as those that have been used before are, unless otherwise specified, the same as the elements with the same reference numerals in the preceding embodiment(s). Where only some features of a configuration are explained, the previously described embodiment can be applied to other features of the configuration.

<Variation 1>

In the embodiment described above, the notification is given visually as one example. In addition to or instead of a visual indication, sound may be used to notify the presence of an obstacle.

<Variation 2>

The indirect wave distance, which is a time interval from when a wave is transmitted to when a reflection wave with an intensity of not less than an object detection level is received, multiplied by the speed of sound and divided by two, may further be multiplied by a compensation coefficient. This compensation coefficient is determined in consideration of the fact that an ultrasonic wave propagates diagonally to the sensor attachment surface.

<Variation 3>

In the embodiment described above, the ultrasonic sensor 10 includes the distance calculator 15. Namely, the detected distance is determined by the ultrasonic sensor 10 in the embodiment described above. Since a direct wave distance and an indirect wave distance are both detected distances, the direct wave distance and indirect wave distance are both determined by the ultrasonic sensor 10 in the embodiment described above. These direct wave distance and indirect wave distance may be calculated by the ECU 20 instead.

If the direct wave distance and indirect wave distance are to be calculated by the ECU 20, the ultrasonic sensor 10 performs calculations to produce the time interval described above, and transmits this time interval to the ECU 20. The ECU 20 multiplies the time interval by the speed of sound and divides the result by two to produce the direct wave distance or indirect wave distance.

Alternatively, the time interval may also be calculated by the ECU 20. In this case, the ultrasonic sensor 10 transmits a signal to the ECU 20 indicating that a reflection wave with an intensity of not less than an object detection threshold has been received. The time point at which the transceiver 11 of the ultrasonic sensor 10 transmits a wave may be either the time point when the ultrasonic sensor 10 notifies the ECU of the transmission of the transmission wave, or the time point when the ECU 20 outputs a transmission instruction signal to the ultrasonic sensor 10.

It is noted that a flowchart or the processing of the flowchart in the present application includes sections (also referred to as steps), each of which is represented, for instance, as S2. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An obstacle detection apparatus for vehicles, the obstacle detection apparatus mounted to a vehicle and comprising:
a first ultrasonic sensor that is arranged at a predetermined part of the vehicle to detect a distance to an obstacle by transmitting and receiving an ultrasonic wave;
a second ultrasonic sensor that is arranged at a position of the vehicle where the second ultrasonic sensor receives a reflection wave of an ultrasonic wave transmitted from the first ultrasonic sensor and reflected by the obstacle to detect a distance to the obstacle by transmitting and receiving an ultrasonic wave;
a notifier that gives a notification of detecting the obstacle present within a preset distance in one or more of predetermined notification areas including
a first notification area denoting a direction where the obstacle is detected with respect to the vehicle through a first direct ultrasonic wave, which is transmitted and received by the first ultrasonic sensor, and
a second notification area being different from the first notification area and denoting a direction where the obstacle is detected with respect to the vehicle through a second direct ultrasonic wave, which is transmitted and received by the second ultrasonic sensor; and
a controller that controls contents to be notified by the notifier, wherein:
the controller determines whether a first indirect wave distance and a second indirect wave distance are adopted to determine whether to give the notification of detecting the obstacle in the first notification area based on a first direct wave distance and a second direct wave distance;
the first indirect wave distance is a distance to the obstacle calculated from an ultrasonic wave, which is transmitted from the first ultrasonic sensor and received by the second ultrasonic sensor;
the second indirect wave distance is a distance to the obstacle calculated from an ultrasonic wave, which is transmitted from the second ultrasonic sensor and received by the first ultrasonic sensor;
the first direct wave distance is a distance to the obstacle calculated by the first ultrasonic sensor from the first direct ultrasonic wave;
the second direct wave distance is a distance to the obstacle calculated by the second ultrasonic sensor from the second direct ultrasonic wave;
the controller determines whether the first indirect wave distance and the second indirect wave distance are adopted as candidate distances to determine a notification distance to the obstacle in the first notification area;
the controller
determines, in response to neither the first direct wave distance nor the second direct wave distance being calculated, the first indirect wave distance and the second indirect wave distance as the candidate distances in a determination whether to give the notification of detecting the obstacle in the first notification area,
selects a shorter one of the first indirect wave distance and the second indirect wave distance, and
notifies of the selected shorter one of the first indirect wave distance and the second indirect wave distance as the notification distance; and
in a condition that the first direct wave distance is not calculated while the second direct wave distance is calculated, the controller does not adopt the first indirect wave distance and the second indirect wave distance as the candidate distances without giving the notification of detecting the obstacle in the first notification area, and adopts the second direct wave distance as the notification distance to give the notification of detecting the obstacle in the second notification area.

2. The obstacle detection apparatus for vehicles according to claim 1,
wherein the controller uses the first indirect wave distance and the second indirect wave distance to determine whether to give the notification of detecting the obstacle in the first notification area, in response to the first direct wave distance being calculated with the first ultrasonic sensor.

3. The obstacle detection apparatus for vehicles according to claim 1, wherein the controller gives a notification regarding the first notification area based on a shortest one of the first indirect wave distance, the second indirect wave distance and the first direct wave distance, in response to the controller determining that the first indirect wave distance and the second indirect wave distance are used to determine whether to give the notification of detecting the obstacle in the first notification area.

4. The obstacle detection apparatus for vehicles according to claim 1,
wherein the controller gives a notification regarding the first notification area based on the first direct wave distance, in response to the controller determining that the first indirect wave distance and the second indirect wave distance are not used to determine whether to give the notification of detecting the obstacle in the first notification area.

5. The obstacle detection apparatus according to claim 1,
wherein the controller determines the candidate distances on condition that a speed of the vehicle is less than a predetermined speed.

6. The obstacle detection apparatus according to claim 1,
wherein the notifier is a display device and is arranged in an interior of the vehicle at a position where a driver of the vehicle can see the display device, the display device displaying an obstacle position notification image,
wherein the obstacle position notification image includes:
a vehicle positional image representing a reference vehicle position; and
a plurality of obstacle notification area images including at least a first notification area image corresponding to the first notification area,
wherein the obstacle notification area images are disposed around the vehicle positional image,
wherein the first notification area image has a plurality of obstacle distance notification images aligned along a direction towards the vehicle positional image,
wherein each of the obstacle distance notification image represents a distance to the obstacle from the vehicle reference position, and
wherein the display device illuminates a corresponding one of the obstacle distance notification images according to the notification distance.

7. The obstacle detection apparatus according to claim 1,
wherein the notifier is a display device and is arranged in an interior of the vehicle at a position where a driver of the vehicle can see the display device,
wherein the controller determines the notification distance without adopting a triangulation calculation, and
wherein the controller controls the display device to display the notification distance determined.

* * * * *